(12) United States Patent
Smith et al.

(10) Patent No.: US 6,689,855 B2
(45) Date of Patent: Feb. 10, 2004

(54) DIFFRACTION DEVICES AND METHODS

(75) Inventors: Dennis W. Smith, Seneca, SC (US);
Hiren V. Shah, Clemson, SC (US);
John Ballato, Central, SC (US);
Stephen Foulger, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 10/196,724

(22) Filed: Jul. 16, 2002

(65) Prior Publication Data

US 2003/0050416 A1 Mar. 13, 2003

Related U.S. Application Data

(62) Division of application No. 09/604,748, filed on Jun. 27, 2000.

(51) Int. Cl.$^7$ .......................... G02B 5/18; C08F 214/18; C08F 216/12
(52) U.S. Cl. ....................... 526/247; 359/558; 359/566; 359/569; 526/252; 526/334; 526/279
(58) Field of Search ................................ 359/566, 558, 359/569; 526/247, 279, 334, 252

(56) References Cited

U.S. PATENT DOCUMENTS

| | | | |
|---|---|---|---|
| 3,397,191 A | 8/1968 | Beckerbauer | |
| 4,663,230 A | 5/1987 | Tennent | |
| 5,006,285 A | 4/1991 | Thackara et al. | |
| 5,007,696 A | 4/1991 | Thackara et al. | |
| 5,021,602 A | 6/1991 | Clement et al. | |
| 5,023,380 A | 6/1991 | Babb et al. | |
| 5,037,917 A | 8/1991 | Babb et al. | |
| 5,037,918 A | 8/1991 | Babb | |
| 5,037,919 A | 8/1991 | Clement et al. | |
| 5,066,746 A | 11/1991 | Clement et al. | |
| 5,159,036 A | 10/1992 | Babb | |
| 5,159,037 A | 10/1992 | Clement et al. | |
| 5,159,038 A | 10/1992 | Babb et al. | |
| 5,162,468 A | 11/1992 | Babb et al. | |
| 5,198,513 A | 3/1993 | Clement et al. | |
| 5,210,265 A | 5/1993 | Clement et al. | |
| 5,246,782 A | 9/1993 | Kennedy et al. | |
| 5,426,164 A | 6/1995 | Babb et al. | |
| 5,627,140 A | 5/1997 | Fossheim et al. | |
| 5,730,922 A | 3/1998 | Babb et al. | |
| 5,850,498 A | 12/1998 | Shacklette et al. | |
| 5,965,237 A | 10/1999 | Bruin et al. | |
| 6,031,945 A | 2/2000 | You et al. | |
| 6,037,105 A | 3/2000 | You et al. | |
| 6,039,897 A | 3/2000 | Lochhead et al. | |
| 6,052,238 A | 4/2000 | Ebbesen et al. | |
| 6,124,365 A | 9/2000 | Lan et al. | |
| 6,126,734 A | 10/2000 | Beall et al. | |
| 6,203,814 B1 | 3/2001 | Fisher et al. | |
| 6,210,867 B1 | 4/2001 | You et al. | |
| 6,268,532 B1 | 7/2001 | DesMarteau et al. | |
| 6,331,265 B1 | 12/2001 | Dupire et al. | |
| 6,395,386 B2 | 5/2002 | Bagrodia et al. | |
| 6,407,155 B1 | 6/2002 | Qian et al. | |
| 6,414,070 B1 | 7/2002 | Kausch et al. | |

OTHER PUBLICATIONS

Written Opinion for International Application No. PCT/US01/09684, International Filing Date Mar. 26, 2001, Clemson University, Clemson, South Carolins, presented Mar. 30, 2000.

Shah, Czerw, Carroll, Goldner, Hwang, Ballato, Smith, Jr., Fluoropolymer Nanotube Composites for Coatings and Nanoscopic Probes, Polym. Mater. Sci. & Eng. (ACS Div. PMSE) 2000, 82, 300.

Foulger, "Reduced Percolation Thresholds of Immiscible Conductive Blends", pp. 1899–1910, Journal of Polymer Science: Part B: Polymer Physics, vol. 37, 1999.

Hafner, Cheung, Lieber, "Growth of Nanotubes for Probe Microscopy Tips," Nature, vol. 398, Apr. 29, 1999, pp. 761–762.

Ajayan, "Nanotubes from Carbon," Chem, Rev. 1999, 99, pp. 1787–1799.

Babb, David A., Snelgrove, Vernon, Smith, Jr., Dennis W. and Mudrich, Scott F., "Novel Step–Growth Polymers from the Thermal [$2\pi+2\pi$] Cyclopolymerization of Aryl Trifluorovinyl Ether Monomers," American Chemical Society, 1996, pp. 431–441.

Byung–Tak Lee, Min–Suk Kwon, Jun–Bo Yoon, and Sang–Yung Shin., Fabrication of Polymeric Large–Core Waveguides for Optical Interconnects Using a Rubber Molding Process, IEEE Photonics Technology Letters, vol. 12, No. 1, Jan. 2000.

D.W. Smith, Jr., H.W. Boone, R. Traiphol, H. Shah, and D. Perahia, Perfluorocyclobutyl Liquid Crystalline Fluoropolymers. Synthesis and Thermal Cyclopolymerization of Bis(trifluorovinyloxy)–α–methylstilbene, pp. 1126–1128, Macromolecules reprinted from vol. 33, No. 4.

PCT International Search Report, PCT/US01/09684, Applicant: Clemson University.

David A. Babb et al., Perfluorocyclobutane Aromataic Ether Polymers. III. Synthesis and Thermal Stability of a Thermoset Polymer Containing Triphenylphosphine Oxide, 2005–2012, Journal of Applied Polymer Science, vol. 69, 1998, XP002179956.

(List continued on next page.)

*Primary Examiner*—Fred Zitomer
(74) *Attorney, Agent, or Firm*—Dority & Manning, P.A.

(57) ABSTRACT

Fluoropolymers consisting of alternating perfluorocyclobutane and aryl ether linkages possess suitable properties for optical waveguides and other devices using refractive properties of the polymers. Perfluorocyclobutane (PFCB) polymers having aryl groups alternating on an ether chain have shown useful physical properties for optical waveguide applications. Processes for micromolding such polymeric films by replicating a pattern or image directly from a silicon master, rather than from a polydimethyl siloxane (PDMS) mold) are disclosed.

17 Claims, 9 Drawing Sheets

OTHER PUBLICATIONS

Jeremiah D. Brown, Small Optics Offer Big Correction, pp. 122–124, Photonics Spectra, Jun. 2000.

Louay, Eldada, Advances in Polymer Integrated Optics, pp. 54–68, IEEE Journal of Selected Topics in Quantum Electronics, vol. 6, No. 1, Jan./Feb. 2000.

Salamone, Joseph C., Perfluorocyclobutane Aromatic Ether Polymers, pp. 4911–4920, Dow Chemical Co. 1995, Polymeric Materials Encyclopedia, vol. 7.

H, Shah, A. Hoeglund, M. Radler, C. Langhoff, and D.W. Smith, Jr., Perfluorocyclobutane (PFCB) Polymers for Optical Fibers and Dielectric Waveguides, pp. 1293–1294, Polymer Reprints (Am. Chem. Soc. Div. Poly. Chem.) 1999, 40(2).

Carroll, et al., U.S. Utility Patent Application, USSN 10/103,562, filed Mar. 21, 2002, entitled: "Halogen Containing–Polymer Nanocomposite Compositions, Methods, and Products Employing Such Compositions", Ref.: CXU–354.

Smith, et al., U.S. Utility Patent Application, USSN 09/943,644, filed Aug. 30, 2001, entitled: "Fluoropolymer Compositions, Optical Devices, and Methods for Fabricating Optical Devices", Ref.: CXU–363.

A.B. Hoeglund, H.V. Shah, J. Ballato, C. Langhoff, S.F. Macha, P.A. Limbach, and D.W. Smith, Jr., "Random Perfluorocyclobutyl Copolymers with Controlled Optical Properties", Polymer Reprints 2000, 41(2), xxxx.

Smith, et al., U.S. Utility Patent Application, USSN 09/943,644, filed Aug. 30, 2001, entitled: "Fluoropolymer Compositions, Optical Devices, and Methods for Fabricating Optical Devices", Ref.: CXU–363.

Database CA 'Online! Chemical Abstracts Service, Columbis, Ohio, retrieved from STN Database accession No. 132:152543 XP002179957 abstract & Polym. Prepr., vol. 40, No. 2, 1999, pp. 1293–1294.

G. Fischbeck, R. Moosburger, C. Kostrzewa, A. Achen, and K. Petermann, Singlemode Optical Wavetuides Using a High Temperature Stable Polymer with losses in the 1.55 Fm Range, pp. 518–519, Electronics Letters, Mar. 13, 1997, vol. 33, No. 6.

PCT International Application, WO 90/15043, (Dow Chemical Co.), Dec. 13, 1990 claims.

PCT International Application, WO90/15082 (Dow Chemical Co.).

U. Siebel, R. Hauffe, and K. Petermann, Crosstalk–Enhanced Polymer Digital Optical Switch Based on a W–shape, pp. 40–41, IEEE Photonics Technology Letters vol. 12 No. 1. Jan. 2000.

Min–Cheol Oh, Myung–Hyun Lee, and Hyung–Jong Lee, Polymeric Waveguide Polarization Splitter with a Buried Birefringent Polymer, pp. 1144–1146, IEEE Photonics Technology Letters vol. 11, No. 9, Sep. 1999.

For Ar =

$T_g = 165\ °C$ $T_g = 350\ °C$ $T_g = 120\ °C$

DIFFRACTION DEVICES AND METHODS

CROSS REFERENCE TO RELATED APPLICATIONS

This application is a divisional of application Ser. No. 09/604,748 filed on Jun. 27, 2000.

FIELD OF THE INVENTION

This invention relates to the use of fluoropolymers and methods of applying fluoropolymers in making components for optical applications. In particular, the invention relates to copolymer compositions and methods for micromolding and microcontact lithographic printing.

BACKGROUND OF THE INVENTION

Polymeric large core waveguides for optical interconnects have been fabricated using rubber molding processes. Large core waveguides are prepared using photoresist patterning processes in a master fabrication procedure.

In the electronics and optical fabrication technologies, optical interconnects have been used in backplane interconnections, board to board interconnections, clock distribution, and a variety of other applications. In particular, lithographic processes have been used because such processes are generally suitable for mass production, are usually insensitive to the polymer selection, and are of relatively low cost. Molding processes have in the past relied on microfabrication by traditional lithography.

More recently, "soft lithographic" techniques have been used to microfabricate an assortment of structures. The micromolding procedure usually involves at least three steps. First, a silicon master is fabricated. Next, a mold is made or replicated from the silicon master. Finally, a transferring process is used to transfer or stamp the replication of the mold by micro-contact printing onto a polymeric material. In master fabrication, a two step baking process of a thick photoresist is used. A polydimethylsiloxane (PDMS) lastomer, which is a type of silicone rubber, is used as the mold. Then a polymer material is replicated from the mold to produce a polymeric optical wave guide which is useful for a variety of applications.

A process for producing polymeric optical wave guides without first preparing a mold would be desirable. However, in practice it has been recognized that physical properties of the polymer used in the processes are very important to the success of the process itself, and to the performance of the optical device in terms of its refractive index.

It has also been recognized in the industry that a need exists for polymeric optical devices which show a fine resolution, thereby enabling the manufacture of smaller components.

At least one publication has recognized that perfluorocyclobutane (PFCB)-containing polymers may be used as a polymer in the fabrication of polymeric large core wave guides for optical interconnects using a rubber molding process. Byung Tak Lee, et al. "Fabrication of Polymeric Large Core Wave Guides for Optical Interconnects Using a Rubber Molding Process", IEEE Photonics Technology Letters, Volume 12, Number 1 (January, 2000). However, this publication does not purport to analyze a full range of PFCB compounds to determine which specific compounds generate tunable optical (i.e. refractive index and $T_g$) performance in the process.

Compounds that may be used to prepare a polymer which is capable of simplifying the process of replication while at the same time providing suitable optical and light transmitting qualities in a final optical device would be desirable. Furthermore, polymers that may be used in a higher resolution device which is capable of providing a diffraction pattern with a narrow line width would be desirable.

SUMMARY OF THE INVENTION

The invention comprises compositions and methods of application of compounds which include fluoropolymers consisting of alternating perfluorocyclobutane and aryl ether linkages. These compositions possess the mechanical, thermal and structural properties and the desired optical clarity required for the manufacture of optical waveguides and the like.

In some applications of the invention, the fluoropolymer may be used both as a reinforcing component and as an optical signal carrier in a structural polymer matrix composite. Such composites may provide fully integrated high speed data transmission mediums with switching and routing capabilities. Thermoplastic and thermosetting polymers containing perfluorocyclobutane (PFCB) and arylene ether linkages provide high performance and a multi-functional polymer. PFCB segments may provide improved dielectric insulation, optical clarity, visible and near infrared wavelengths, increased solubility, melt processability and other valuable properties.

In one aspect of the invention, a co-polymer is provided which comprises a poly-aryl ether with perfluorocyclobutyl (PFCB) linkages comprising a chain polymer having the formula:

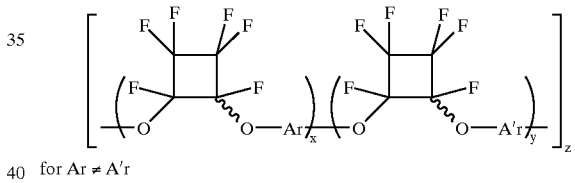

for Ar ≠ A'r

In the above polymer, z is generally greater than or equal to 2, and the Ar and Ar' group comprises a substituted or non-substituted aryl which is capable of forming a suitable polymer of both linear thermoplastic and thermosetting types. In some applications of the invention, the aryl group includes multiple aromatic rings attached to the PFCB polymer. For example, any one or more of the following aryl groups may be provided:

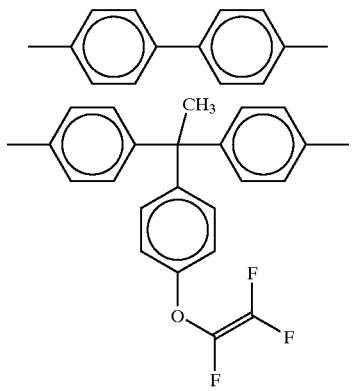

-continued

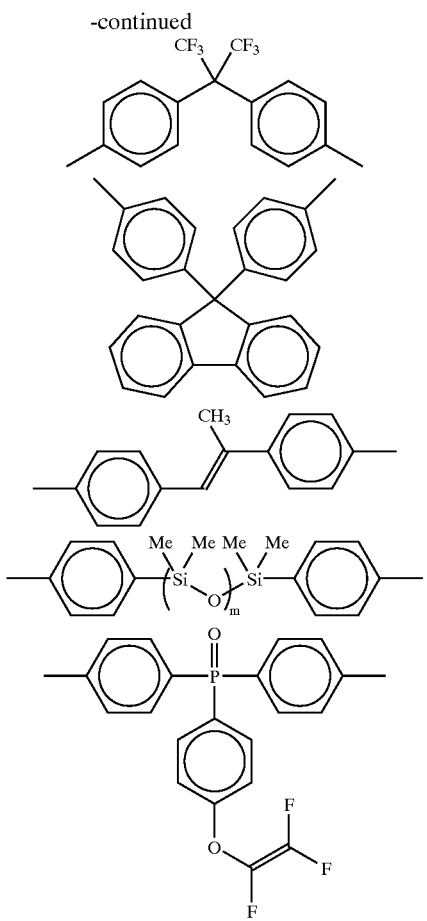

Of course, the above groups may be substituted with other alkyl or organic constituents on the one or more carbons, such as a carbon comprising the ring structure, and the above structures are provided by way of example and not by way of limitation. In some applications, a polymer is provided which is prepared from a trifluorovinyl aromatic ether (TVE). Trifluorovinyl aromatic ether monomer precursors are traditionally prepared in two high yielding steps from commercially available phenolic precursors such as, for example, tris(hydroxyphenyl)ethane, biphenol, bishydroxyphenyl fluorene, or other compounds. Partially inorganic monomers containing siloxane and phosphine oxide groups have also been synthesized using an intermediate strategy involving delivery of a TFVE group intact via Grignard and organo-lithium chemistry.

The invention further comprises a method of making a PFCB polymer film which comprises the steps of providing a silicon master, replicating a PFCB polymer directly from the silicon master, and then curing the polymer. In some cases, the replicating step comprises applying a PFCB liquid polymer into the silicon master. In other applications, the replicating step comprises providing an oligomer or a co-oligomer onto the silicon master. In other applications of the invention, a diffraction device or an optical waveguide may be prepared in which the ridges of the diffraction device are spaced less than 50 μm apart. Further, an optical device may be prepared using the method in which the ridges of the diffraction device are spaced less than 25 μm apart. In other preferred embodiments, the ridges of the diffraction grating or device may be spaced less than 1 μm apart, and in other embodiments as little as 0.5 μm apart.

A method of making a PFCB polymer film or copolymer for variable optical properties, e.g. refractive index is provided which comprises providing a silicon master, replicating a mold from the silicon master, replicating a PFCB polymer from the mold by providing uncured components into the mold, and then curing the components to form a polymer product.

Polymers with a wide range of mechanical, thermal and optical properties may be obtained using the above referenced chemistry. In particular, the refractive indices of the homopolymers or the co-polymers may be provided exactly as designed by careful regulation of monomer choice. Thus the refractive index as a function of wavelength can be precisely controlled. The invention is capable of providing well defined cyclopolymerization mechanisms using PFCB to prepare polymers with tunable thermal and optical properties. For example, random amorphous co-polymers with variable refractive indices, glass transition temperatures, and long term thermal stability above 350° C. may be prepared by correct choice of a co-monomer composition. Co-polymers may be prepared by simple melt mixing of variable composition monomer mixtures and heating under appropriate conditions. Using the invention, it is possible under some conditions to provide for precise control of refractive index by the choice of co-monomer which is used. Thus, the thermal cyclopolymerization of aromatic trifluorovinyl ether monomers to perfluorocyclobutane polymers and co-polymers affords high temperature, low transmission loss, and variable refractive index for use in optical telecommunication devices and the like.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions. Poly-aryl ethers containing perfluorocyclobutyl (PFCB) linkages are viable candidates for optical and opto-electronic applications due in part to their wide range of complementary properties. The properties of such compounds include excellent thermal and thermo-oxidative stability, high $T_g$, low moisture absorption, low dielectric constant, variable refractive index, and desirable melt and solution processability. Furthermore, poly-aryl ethers containing PFCB linkages are among the few known optical polymers to possess low attenuation losses in the technologically important 1,550 and 1300 nm region.

Figure 1:
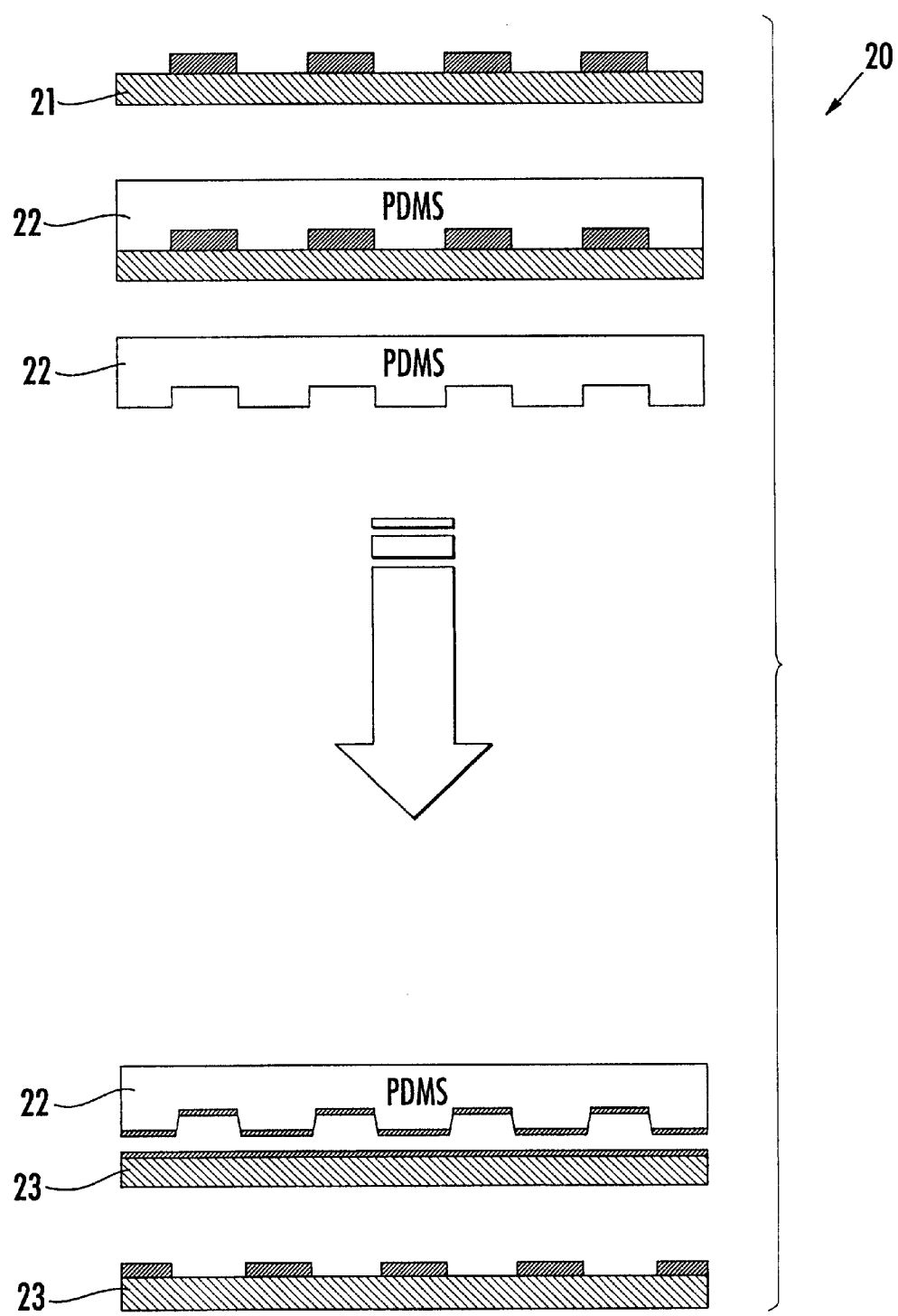
FIG. 1 is an illustration of the micro-fabrication accomplished in the prior art processes using micro-contact printing.

Turning now to the Figures, FIG. 1 shows a simplified schematic of prior art processes for soft lithography micro-fabrication 20 which begins with a silicon master 21. A PDMS (polydimethylsiloxane) layer 22 is applied as a liquid to the silicon master 21 and allowed to harden. Then, the replicated PDMS layer is removed from the silicon master. The PDMS layer then is used to replicate a PFCB (perfluorocyclobutane) polymer structure 23.

Figure 1A:
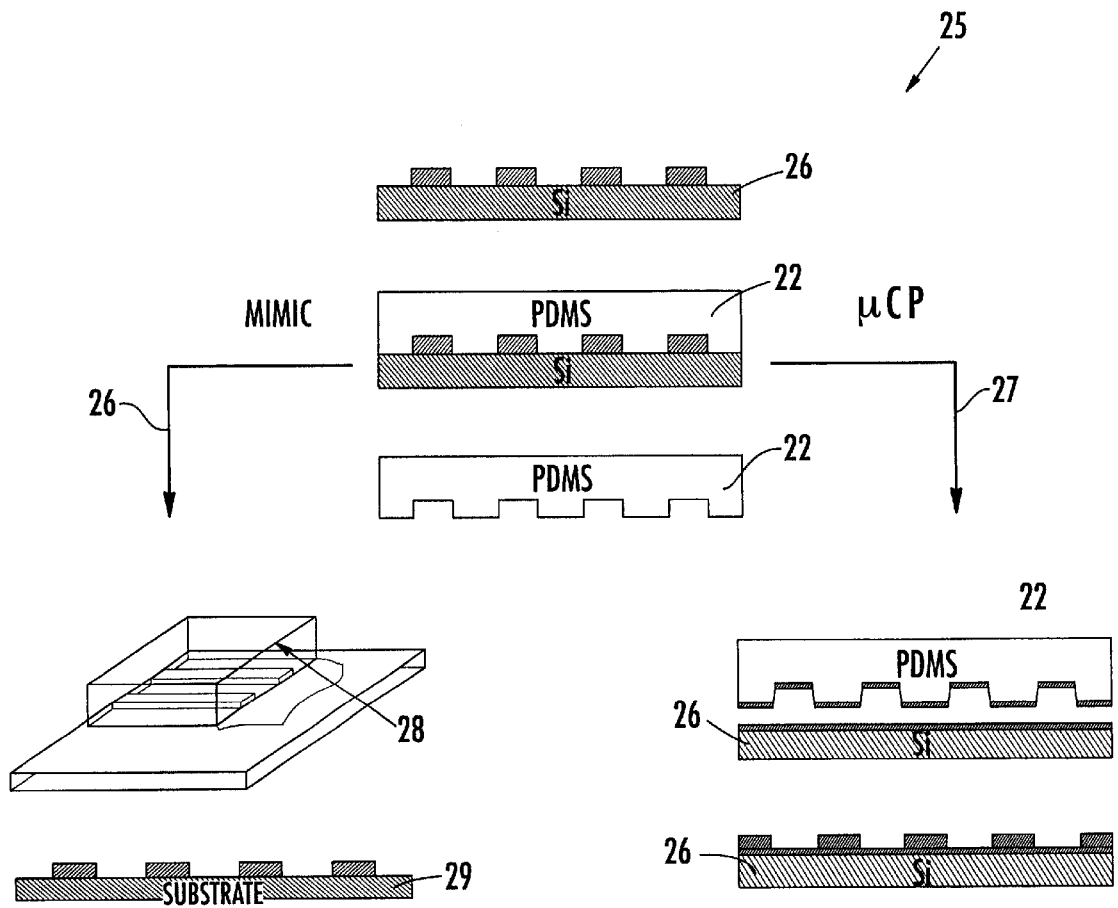
FIG. 1A shows conventional non-photolithographic methods for device fabrication.

FIG. 1A shows a schematic diagram showing conventional (prior art) non-photolithographic processing method 25 which employs micromolding in capillaries (MIMIC) 26 and microcontact printing ($\mu$CP) 27. The MIMIC process provides a polymer melt on the surface of the silicon master 26, followed by hardening into a substrate 29. On the other hand, processes employing microcontact printing use a standard replication, as shown at the right side of the FIG. 1A.

Figure 2:
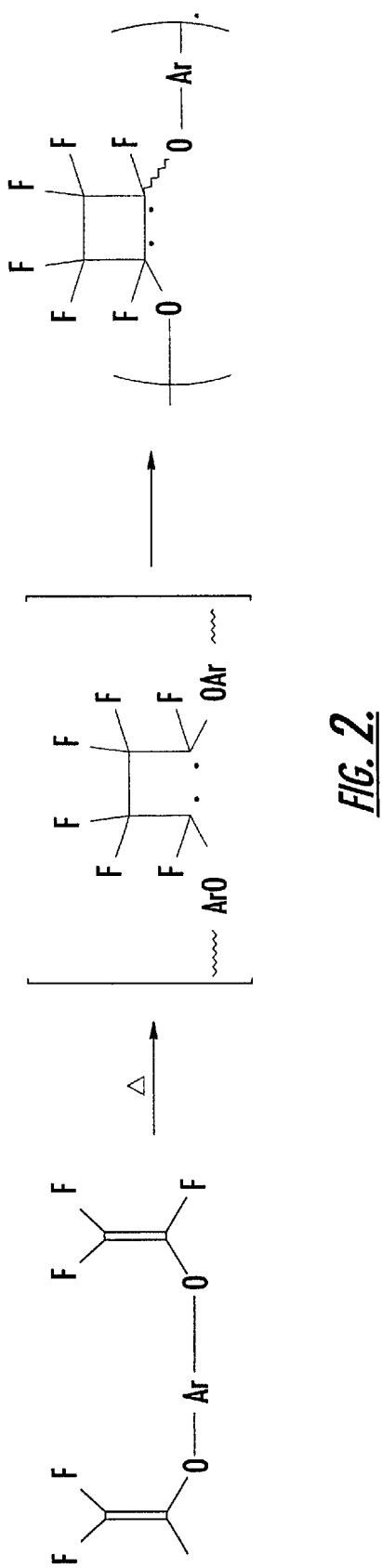
FIG. 2 shows a typical perfluorocyclobutane (PFCB) linkage.

PFCB polymers are prepared from trifluorovinyl aromatic ether monomers via a free radical mediated thermal co-polymerization mechanism as shown in FIG. 2. A representative example of some of the groups that may be included and used as the Ar group as shown in FIG. 2 are included in FIGS. 3A–3G. A variety of monomers may be used to produce the PFCB polymers, however, the monomers shown in FIGS. 3A, 3B, and 3C have been studied in some detail pursuant to work done in connection with this invention. Bis- and tris-functionalized TVE monomers polymerize to form linear or network polymers respectively with unique optical, thermal and mechanical properties. Furthermore, accurate controls over the polymer properties may be achieved by co-polymerization. For example, the PFCB polymer shown in FIG. 3B is suitable for task specific photonic and opto-electronic applications. Discussions of remaining Figures are presented below in connection with the Example.

There are procedures that can be used to fabricate microscopic and submicroscopic device suitable patterns of PFCB polymers and copolymers. These procedures do not involve photo-lithography but instead rely upon photolithographically generated silicon masters for rapid replication of PFCB based microstructures. In addition, methods may be used which preclude the need for elastomeric negative molds for a more cost effective and reproducible prototype.

EXAMPLE

Synthesis of TVE monomers has been performed. TVE monomers were melt or solution polymerized either in-situ or ex-situ during micro-fabrication at 150–160° C. under inert condition.

Figure 3A:
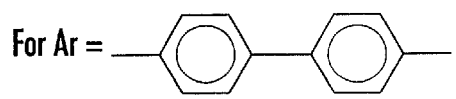
FIG. 3 depicts groups that may be substituted in a poly-aryl ether having perfluorocyclobutyl linkages of FIGS. 3A–G, wherein the Ar groups would be substituted onto the linkage shown in FIG. 2.
Figure 3B:
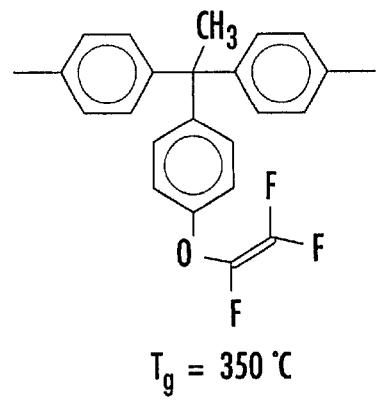
Figure 3C:
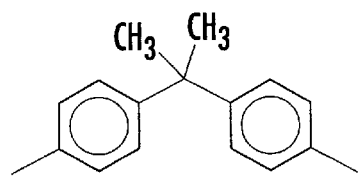
Figure 3D:
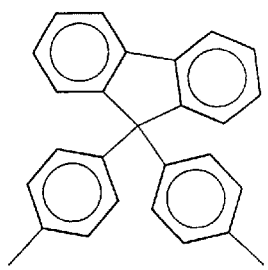
Figure 3E:
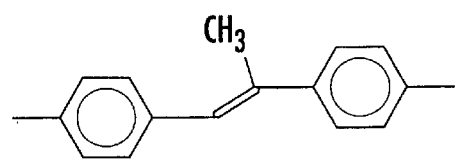
Figure 3F:
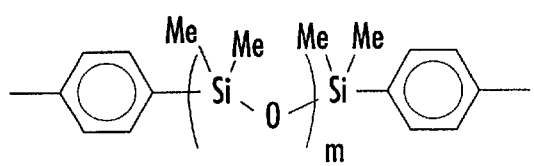
Figure 3G:
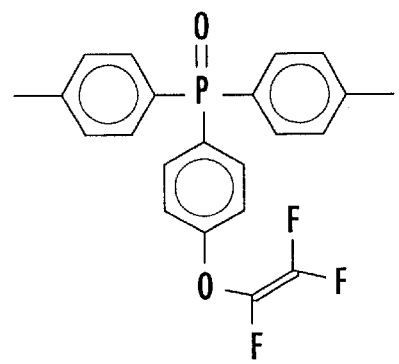

Polymers shown in FIGS. 3A, 3B, and 3C have been used for optical applications. Bis and tris functionalized TVE monomers polymerize to form linear or network polymers respectively with unique optical, thermal and mechanical properties. Accurate control over polymer properties can be achieved by copolymerization. Microscopic and submicroscopic device suitable patterns of PFCB polymers and copolymers may be employed which do not involve photolithography but rely upon photolithographically generated silicon masters for rapid replication of PFCB based microstructures, as further shown in FIG. 5. In addition, methods have been developed that preclude the need for elastomeric negative molds for more cost effective and reproducible prototypes, as further shown below. Refractive indices were measured using an Abbe Refractometer, modified to permit wavelength tuning. Scanning electron micrographs were obtained using a Hitachi S-4700 field emission microscope. Silicon master templates (diffraction gratings with 1 mm pitch in this case) were generated by first coating 75 mm diameter p-type <100>wafers with 1.1 mm thick Shipley S1811 photoresist followed by 2.8 second exposure in a contact aligner using 1 mm pitch chrome mask. After developing the photoresist, the grating pattern was transferred onto the silicon substrate by reactive ion etching (RIE) with $CHF_3/SF_6$ gaseous mix. Transmission spectra were collected on a Shimadzu UV3101 spectrophotometer and reflectance data was obtained using a Gretag Macbeth CE741 goniospectrometer.

PFCB polymers can be prepared neat or in solution at temperatures in excess of 160° C. and do not require initiators or catalysts. The polymerization proceeds via a thermally activated cyclodimerization process as shown in FIG. 2. Although free-radical mediated, the cycloaddition polymerization follows classical step growth kinetics as shown earlier. The polymers can be advanced to precisely controlled viscosity, molecular weight and dispersity by simple heating. The bifunctional TVE monomers yield linear polymers with $M_n \approx 80,000$ whereas trifunctional monomers can be melt advanced to branched pre-networks and processed prior to final cure. PFCB materials, in general, possess excellent thermal ($T_g$=120–350° C.), mechanical and environmental properties providing long-term stability at 350° C. The adaptability of PFCB polymers for optical applications can be further demonstrated by their low visible/NIR loss characteristics and variable refractive indices achieved from random copolymers by simply controlling the co-monomer composition as shown in FIG. 4.

Figure 4:
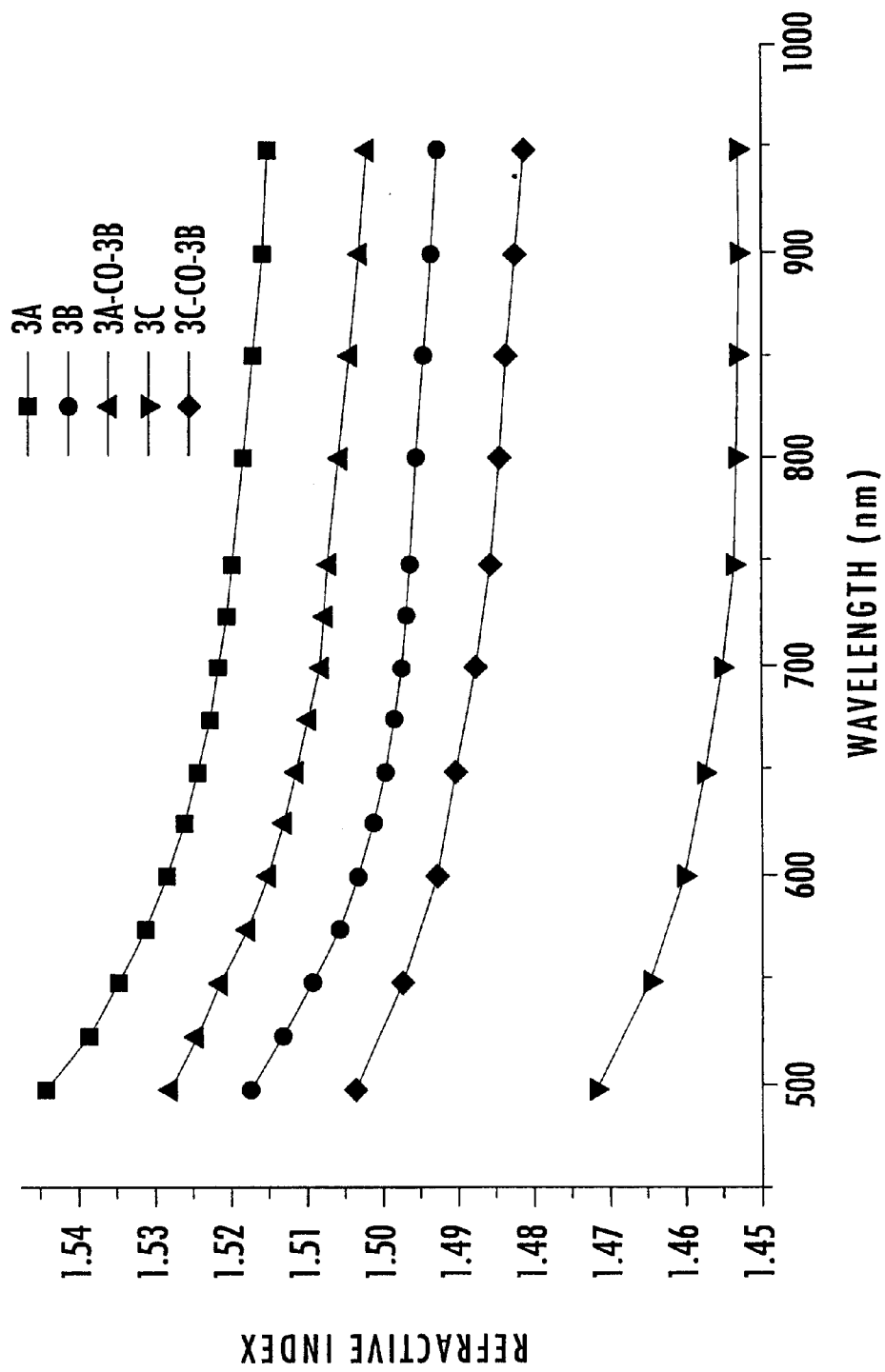
FIG. 4 shows the refractive indices of several PFCB homo and copolymers as a function of wavelength, including particularly the aryl groups shown in FIGS. 3A, 3B, and 3C and mixtures thereof.

In FIG. 4, the wavelength is plotted against the refractive index for compounds shown as FIGS. 3A, 3B, 3C and also for co-polymerized compounds 3A/3B and 3C/3B.

Figure 5:
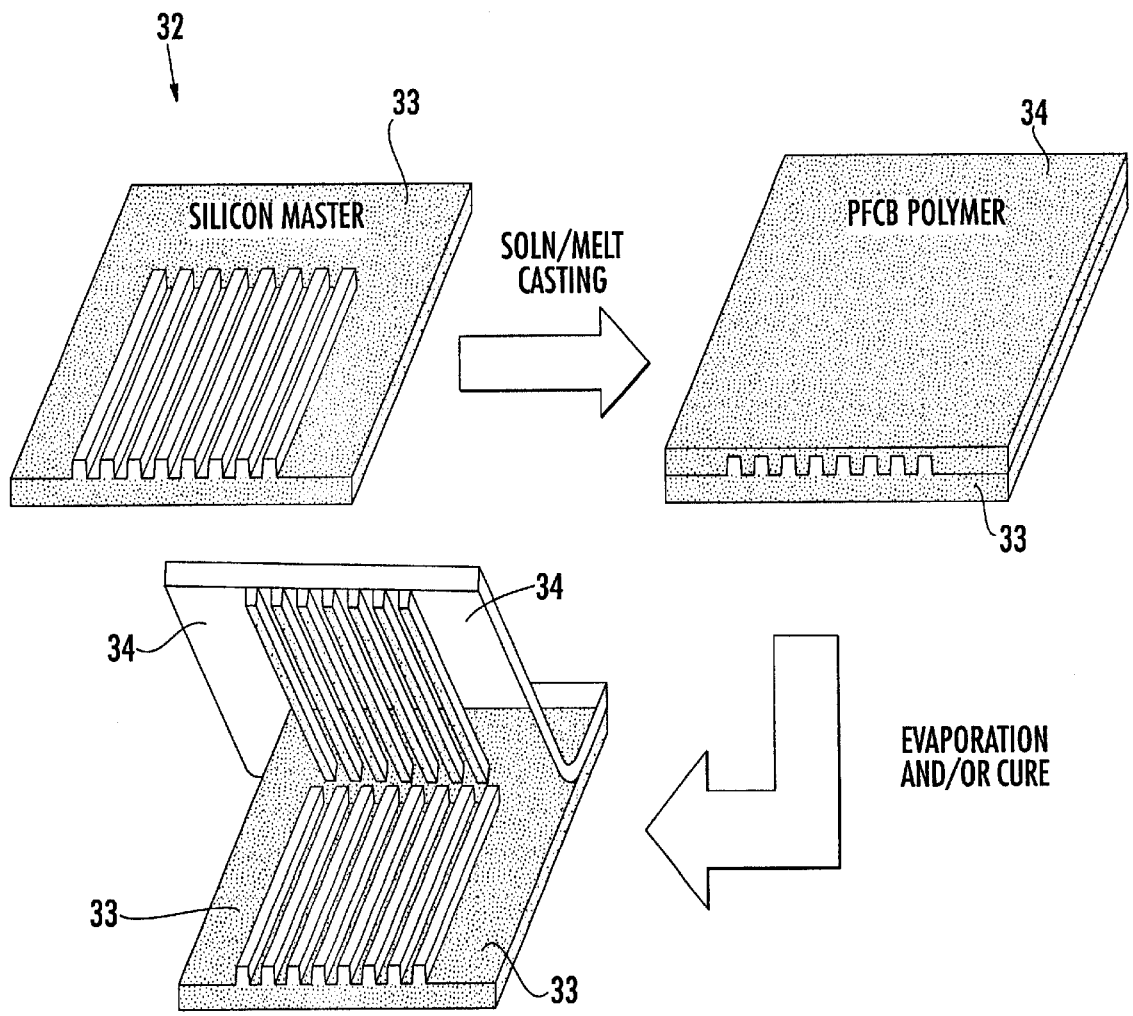
FIG. 5 shows a negative mold free microfabrication technique for sub-micro printed PFCB films.

Micro-contact printing (mCP) and micro-molding in capillaries (MIMIC), as shown in the prior art (FIG. 1A) both techniques work with PFCB polymers. However, surprisingly, it has been found that the PDMS negative-mold can be eliminated for PFCB polymers, greatly simplifying the process. Referring now to FIG. 5, PFCB replicas may be generated by directly molding the polymer against silicon masters as shown schematically. A negative mold free micromolding process 32 is shown with silicon master 33 subjected to solution melt casting. A PFCB polymer 34 is applied to the silicon master 33, and following evaporation or cure, a PFCB polymer is produced.

Since PFCB polymers provide low interfacial surface energy, the replicated structures can be easily lifted off from the master without irreversible adhesion or defects. Homopolymers or copolymers can be melt or solution cast onto the silicon masters containing 0.5 mm features. However, the lift-off process is simplified to a large extent by solution-casting due to the plasticizing effect of the solvent which can be subsequently removed by vacuum drying.

Figure 6:
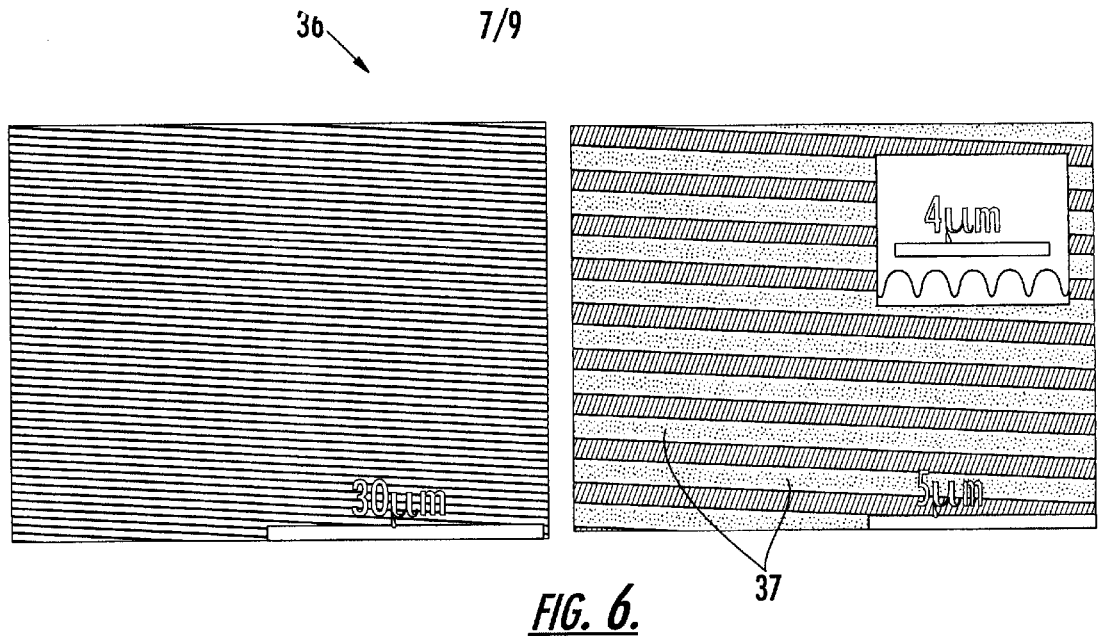
FIG. 6 illustrates the surface topography and a cross sectional view of the PFCB diffraction grating.
Figure 7:
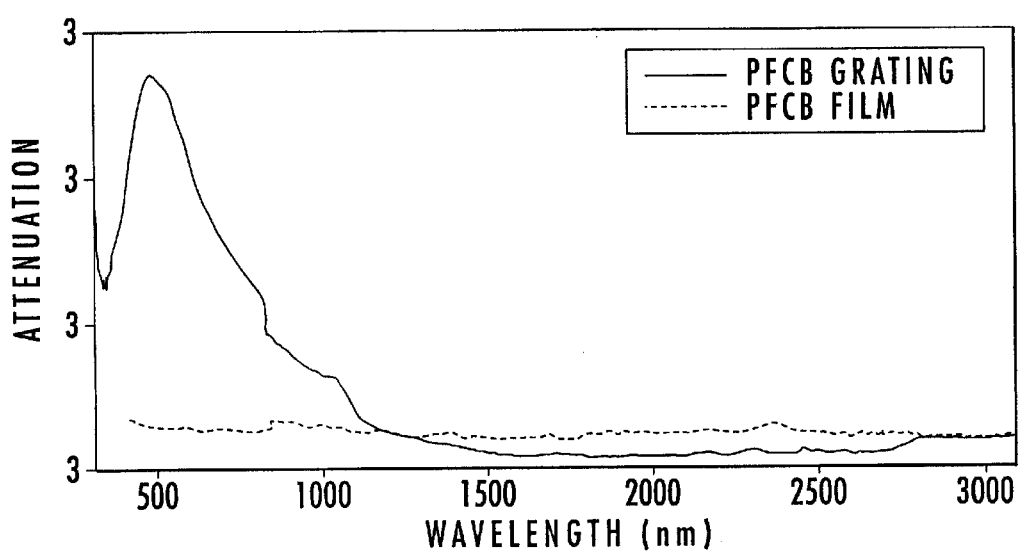
FIG. 7 shows a UV/Vis/NIR transmission response of a PFCB grating in comparison with a PFCB thin film.
Figure 8:
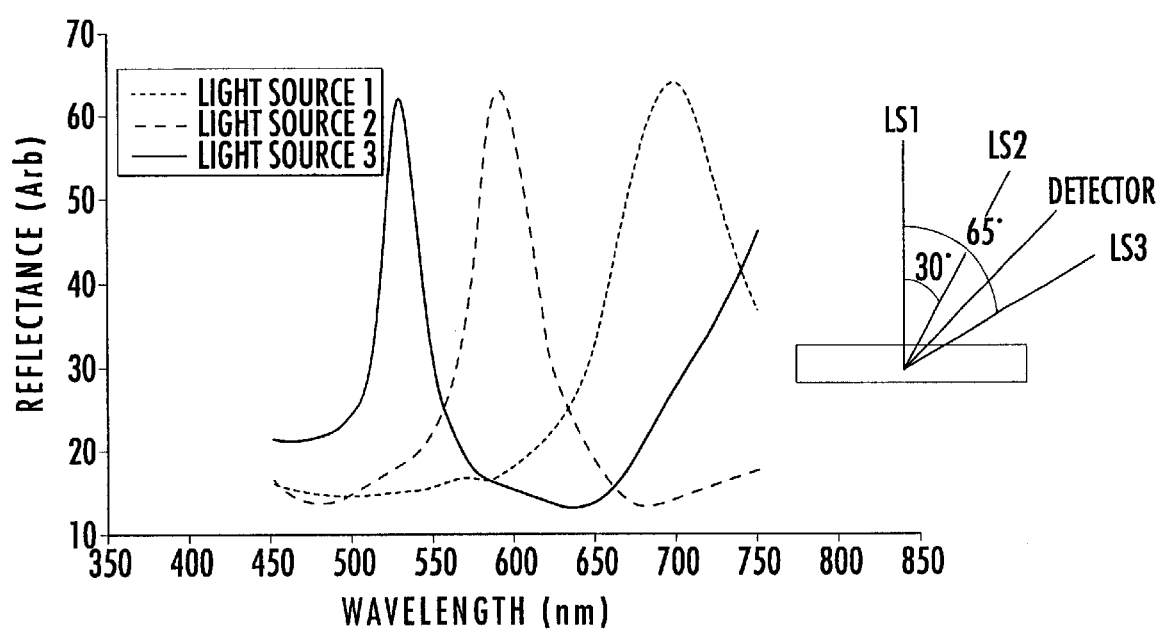
FIG. 8 shows a UV/Vis reflectance response of a PFCB grating at several different viewing angles as shown in the inset.

The fabricated submicron PFCB gratings were examined by Scanning Electron Microscopy as shown in FIG. 6. The surface topography and spacing were found to be uniform over large surface areas without any noticeable defects or distortions. Diffraction grating 36 is shown with ridges 37 shown in the Figure with the distance between each ridge of about 1.0 $\mu$m. In some applications, the ridges may be further apart, as much as 10–20 $\mu$m, or even as great at 30–49 $\mu$m apart. In some applications, the ridges may be as small as 0.5 $\mu$m or less in spaced relation to each other. However, this resolution is still significantly better than most prior art processes. The cross-section (inset) shows artificial contortion due to ductile "pull-out" of the sample. The grating performance was tested by measuring the optical response in the transmission and reflection geometries. FIG. 7 shows the UV/Vis/NIR transmission profile of a PFCB diffraction grating in comparison with a PFCB planar film. A peak at 500 nm is observed due to the attenuation caused by the 500 nm spacing of the grating. A second order diffraction peak at 1000 nm is also evident. The observed peaks are broader than expected because of sample curvature and/or finite beam size effects, which most likely accessed a range of incident angles. On the other hand the UV/Vis reflectance measurement show well-defined peaks covering the entire spectrum for several incident angles as indicated in FIG. 8.

The "negative mold-free" technique highlighted in this process demonstrates feature reproduction at submicron scales. Refractive indices of PFCB polymers can be precisely controlled making them suitable for optical and opto-electronic applications. These polymers can also be micro-patterned with 0.5 mm features using soft-lithographic techniques. A novel "negative mold-free" technique also simplifies the fabrication process by eliminating several steps from the conventional methods and produces free standing PFCB micro-structures.

Figure 9:
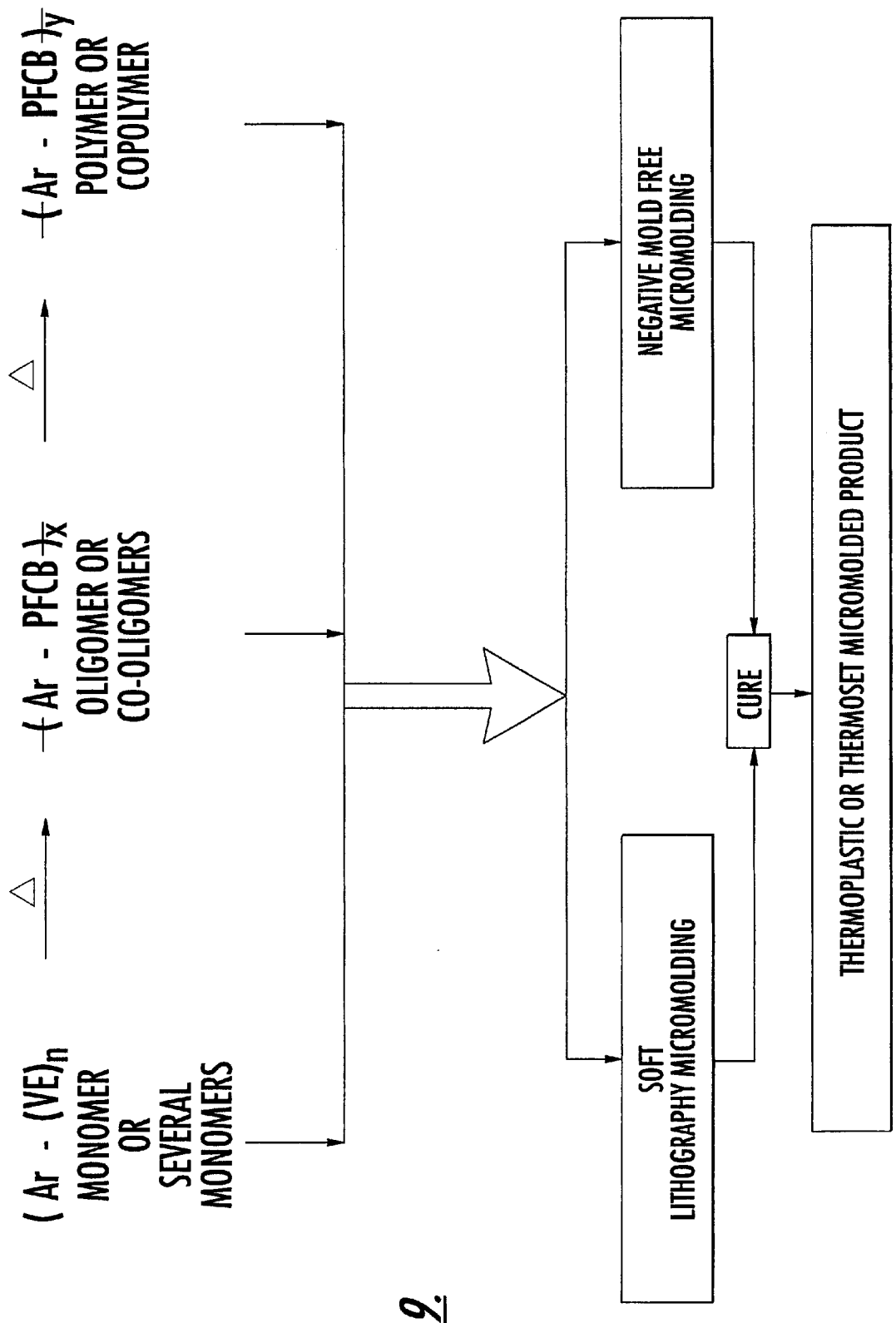
FIG. 9 is a flow schematic showing by way of overview processes that may be used in the present invention.

FIG. 9 shows several applications of the invention. First, a monomer may be reacted to an ologomer, and further to a polymer or copolymer. Any one of these may be used in micromolding an optical device. For example, a monomer may be introduced onto a silicon master, and allowed to cure while resident on the master. Or, an ologomer may be introduced onto a master, and treated in much the same way. Alternately, a fully polymerized material in liquid form may be applied to a silicon master, and hardened. Micromolding is followed by curing the polymer, and formation of a thermoplastic or thermoset micromolded product.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A ridged perfluorocyclobutane diffraction grating produced by a process comprising:
   (a) providing a patterned master template having spaced ridges;
   (b) providing a composition in a solvent, the composition being selected from compositions consisting of: homopolymers, copolymers, oligomers, co-oligomers, and monomers;
   (c) reacting said composition to form a perfluorocyclobutane species;
   (d) replicating a pattern from said patterned master template upon said perfluorocyclobutane species; and
   (e) curing said perfluorocyclobutane species to form a replicated perfluorocyclobutane diffraction grating having ridges.

2. The diffraction grating as in claim 1 in which said ridges of said diffraction grating are spaced less than 25 $\mu$m apart.

3. The diffraction grating as in claim 1 in which said ridges of said diffraction grating are spaced less than 1 $\mu$m apart.

4. The ridged perfluorocyclobutane diffraction grating of claim 1 in which said ridges of said diffraction grating are formed by applying a solution upon said patterned master template, said solution comprising a perfluorocyclobutane species which includes a liquid polymer.

5. The ridged perfluorocyclobutane diffraction grating of claim 1 wherein said ridges of said diffraction grating are formed by employing a composition as provided in step (b) which includes an oligomer.

6. The ridged perfluorocyclobutane diffraction grating of claim 1 in which said composition provided in step (b) comprises a monomer, said monomer being provided in liquid form.

7. A ridged diffraction grating comprising a perfluorocyclobutane (PFCB), said ridged diffraction grating made by:
   (a) providing a patterned master template;
   (b) providing a perflourocyclobutane homopolymer;
   (c) replicating said patterned master template upon said perfluorocyclobutane homopolymer; and
   (d) curing the perfluorocyclobutane homopolymer to form a ridged perfluorocyclobutane diffraction grating.

8. The ridged diffraction grating of claim 7 wherein the perfluorocyclobutane homopolymer employed comprises:

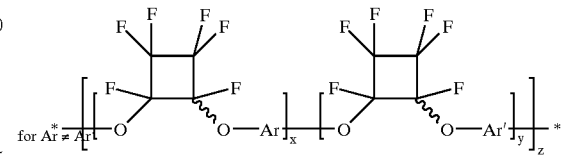

wherein z is greater than or equal to 2, and wherein x and y each are greater than or equal to 1, respectively, and wherein Ar and Ar' groups are selected from the group comprising:

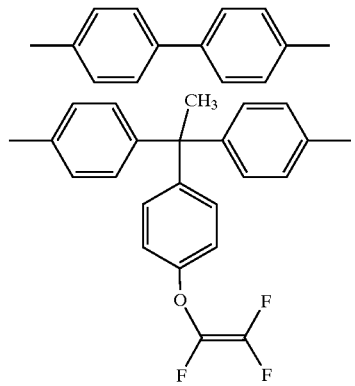

-continued

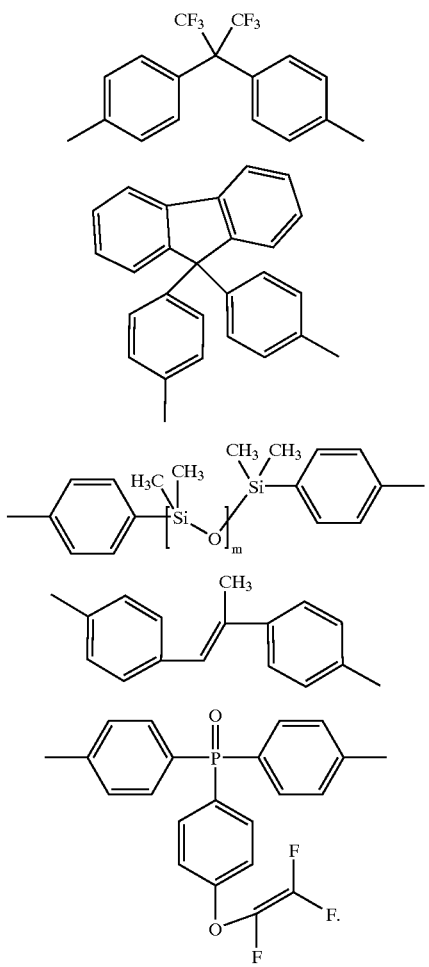

9. A perfluorocyclobutane (PFCB) diffraction grating having ridges formed by patterning said grating upon a ridged master template, said grating formed by replicating said ridged master template upon a liquid perfluorocyclobutane co-polymer and subsequently curing and hardening said perfluorocyclobutane co-polymer in forming said diffraction grating.

10. An optical device comprised of a perfluorocyclobutane co-polymer, said co-polymer comprising:

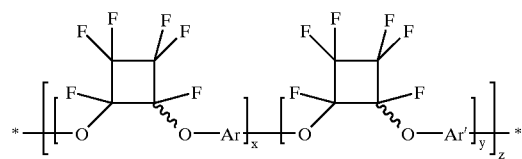
for Ar ≠ Ar' wherein z is greater than or equal to 2, and wherein x and y each are greater than or equal to 1, respectively, and wherein the Ar and the Ar' groups are different, such that each independently comprise substituted or nonsubstituted aryls selected from the group comprising:

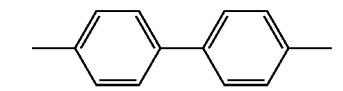

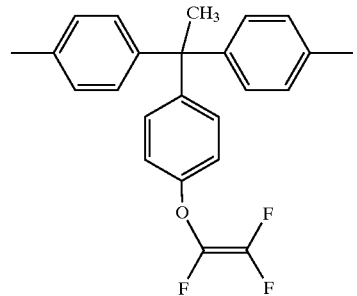

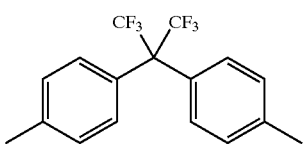

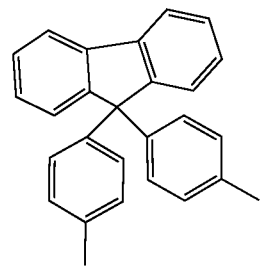

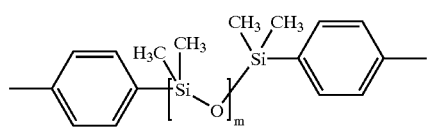

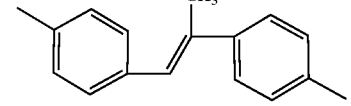

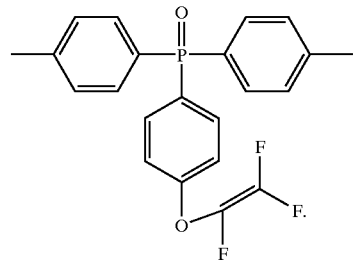

11. A ridged diffraction grating comprising a cured perfluorocyclobutane (PFCB) substrate of a perflurocyclobutane co-polymer, the co-polymer comprising

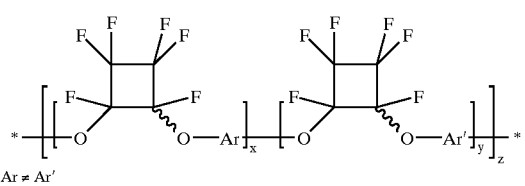
for Ar ≠ Ar' wherein z is greater than or equal to 2, and wherein x and y each are greater than or equal to 1, respectively, and wherein Ar and Ar' each are independently selected from the group consisting of:

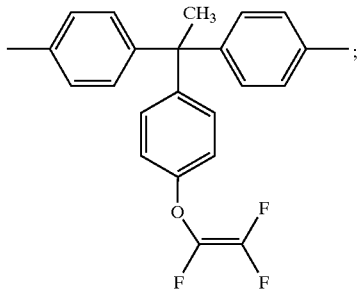

and

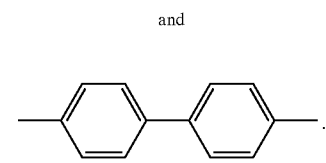

12. A ridged diffraction grating comprising a cured perfluorocyclobutane (PFCB) film of a perflurocyclobutane co-polymer, the co-polymer comprising

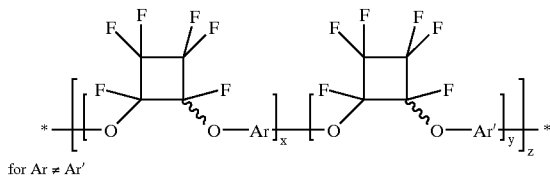

for Ar ≠ Ar' wherein z is greater than or equal to 2, and wherein x and y each are greater than or equal to 1, respectively, and wherein Ar and Ar' each are independently selected from the group consisting of:

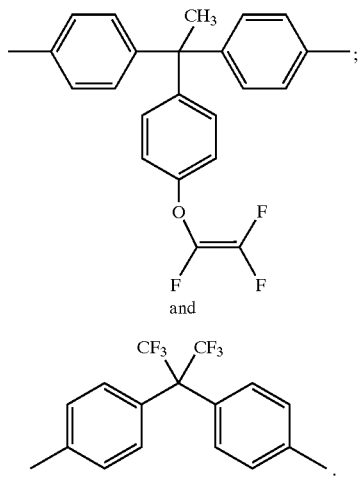

and

13. A diffraction device comprised of a substrate having ridges, said substrate comprising a fluorine-containing polymer.

14. The diffraction device of claim 13 wherein said fluorine-containing polymer comprises a perfluorocyclobutane.

15. The device of claim 14 wherein ridges of said diffraction device are spaced at intervals of about 500 nm, said device exhibiting a first order optical diffraction peak at about 500 nm.

16. The device of claim 15 wherein the device exhibits a second order optical diffraction peak at about 1000 nm.

17. A ridged polymeric diffraction device produced by a process comprising:
  (a) providing a silicon master having ridges;
  (b) replicating a mold from the silicon master; said mold having ridges;
  (c) providing a composition in a solvent, the composition being selected from compositions consiting of: homopolymers, copolymers, oligomers, co-oligomers, and monomers;
  (d) reacting said composition to form a perfluorocyclobutane species;
  (e) replicating a perfluorocyclobutane polyer from the perfluorocyclobutane species by curing, thereby forming a ridged polymeric diffraction device, wherein said device comprises spaced ridges of polymeric material.

* * * * *

UNITED STATES PATENT AND TRADEMARK OFFICE
CERTIFICATE OF CORRECTION

PATENT NO. : 6,689,855 B2  Page 1 of 1
DATED : February 10, 2004
INVENTOR(S) : Dennis W. Smith et al.

It is certified that error appears in the above-identified patent and that said Letters Patent is hereby corrected as shown below:

Drawings,
Figure 3C, " $H_3C\diagdown\diagup CH_3$ " should be -- $CF_3\diagdown\diagup CF_3$ --

Column 1,
Line 39, "lastomer" should be -- elastomer --

Column 2,
Line 39, "—A'r—" should be -- —Ar'— --
Line 40, "A'r" should be -- Ar' --

Signed and Sealed this

Fourteenth Day of September, 2004

JON W. DUDAS
*Director of the United States Patent and Trademark Office*